United States Patent
Lin et al.

(10) Patent No.: US 9,034,962 B2
(45) Date of Patent: May 19, 2015

(54) METHOD OF PRODUCING A TIRE COMPOSITION HAVING IMPROVED SILICA REINFORCEMENT

(75) Inventors: Chenchy Jeffrey Lin, Hudson, OH (US); Shunji Araki, Kodaira (JP); Haiying Zhou, Plymouth, MN (US)

(73) Assignee: Bridgestone Corporation, Tokyo (JP)

( * ) Notice: Subject to any disclaimer, the term of this patent is extended or adjusted under 35 U.S.C. 154(b) by 10 days.

(21) Appl. No.: 11/587,629

(22) PCT Filed: Apr. 27, 2005

(86) PCT No.: PCT/US2005/014561
§ 371 (c)(1),
(2), (4) Date: Jul. 30, 2007

(87) PCT Pub. No.: WO2005/105854
PCT Pub. Date: Nov. 10, 2005

(65) Prior Publication Data
US 2007/0299197 A1 Dec. 27, 2007

Related U.S. Application Data

(60) Provisional application No. 60/565,723, filed on Apr. 27, 2004.

(51) Int. Cl.
*C08J 3/20* (2006.01)
*C08K 3/36* (2006.01)
*C08K 5/17* (2006.01)
*C08L 21/00* (2006.01)

(52) U.S. Cl.
CPC ............... *C08J 3/203* (2013.01); *C08L 21/00* (2013.01); *C08J 2321/00* (2013.01); *C08K 3/36* (2013.01); *C08K 5/17* (2013.01)

(58) Field of Classification Search
CPC ........ C08J 3/203; C08J 2321/00; C08K 3/36; C08K 5/17; C08L 21/00
USPC .......................................... 524/261
See application file for complete search history.

(56) References Cited

U.S. PATENT DOCUMENTS

| | | | |
|---|---|---|---|
| 3,814,160 A | 6/1974 | Creasey et al. | |
| 4,076,550 A | 2/1978 | Thurn et al. | |
| 4,297,145 A | 10/1981 | Wolff et al. | |
| 4,436,847 A | 3/1984 | Wagner | |
| 4,474,908 A | 10/1984 | Wagner | |
| 5,227,425 A | 7/1993 | Rauline | |
| 5,328,949 A | 7/1994 | Sandstrom et al. | |
| 5,336,730 A | 8/1994 | Sandstrom et al. | |
| 5,504,137 A | 4/1996 | Sandstrom et al. | |
| 5,508,333 A | 4/1996 | Shimizu | |
| 5,534,574 A | 7/1996 | Sandstrom et al. | |
| 5,580,919 A | 12/1996 | Agostini et al. | |
| 5,605,951 A | 2/1997 | Sandstrom et al. | |
| 5,659,056 A | 8/1997 | Hergenrother et al. | |
| 5,674,932 A | 10/1997 | Agostini et al. | |
| 5,681,874 A | 10/1997 | Lucas et al. | |
| 5,717,022 A | 2/1998 | Beckmann et al. | |
| 5,780,537 A | 7/1998 | Smith et al. | |
| 5,780,538 A | 7/1998 | Cohen et al. | |
| 5,804,636 A | 9/1998 | Nahmias et al. | |
| 5,811,479 A | 9/1998 | Labauze | |
| 5,866,171 A | 2/1999 | Kata | |
| 5,872,171 A | 2/1999 | Detrano | |
| 5,872,176 A | 2/1999 | Hergenrother et al. | |
| 5,876,527 A | 3/1999 | Tsuruta et al. | |
| 5,914,364 A | 6/1999 | Cohen et al. | |
| 5,916,951 A | 6/1999 | Nahmias et al. | |
| 5,916,961 A | 6/1999 | Hergenrother et al. | |
| 5,929,149 A | 7/1999 | Matsuo et al. | |
| 5,931,211 A | 8/1999 | Tamura | |
| 5,971,046 A | 10/1999 | Koch et al. | |
| 6,008,295 A | 12/1999 | Takeichi et al. | |
| 6,022,922 A | 2/2000 | Bergh et al. | |
| 6,022,923 A | 2/2000 | Araki et al. | |
| 6,025,428 A | 2/2000 | Day | |
| 6,046,266 A | 4/2000 | Sandstrom et al. | |
| 6,053,226 A | 4/2000 | Agostini | |
| 6,057,392 A | 5/2000 | Wideman et al. | |
| 6,080,809 A | 6/2000 | Stuhldreher | |
| 6,220,323 B1 | 4/2001 | Sandstrom et al. | |
| 6,221,943 B1 | 4/2001 | Hergenrother et al. | |
| 6,228,908 B1 | 5/2001 | Takeichi et al. | |
| 6,242,516 B1 | 6/2001 | Araki et al. | |
| 6,279,632 B1 | 8/2001 | Hogan et al. | |
| 6,313,210 B1 | 11/2001 | Lin et al. | |
| 6,420,488 B1 | 7/2002 | Penot | |
| 6,433,065 B1 | 8/2002 | Lin et al. | |
| 6,512,035 B1 | 1/2003 | Hergenrother et al. | |
| 6,608,145 B1 | 8/2003 | Lin et al. | |
| 6,747,085 B2 | 6/2004 | Sone et al. | |
| 7,119,150 B2 | 10/2006 | Lin et al. | |
| 2003/0100660 A1* | 5/2003 | Zanzig et al. | 524/492 |
| 2006/0086450 A1 | 4/2006 | Hogan et al. | |
| 2006/0089446 A1 | 4/2006 | Lin et al. | |
| 2006/0106143 A1 | 5/2006 | Lin et al. | |
| 2006/0199885 A1 | 9/2006 | Lin et al. | |
| 2006/0217473 A1 | 9/2006 | Hergenrother et al. | |

FOREIGN PATENT DOCUMENTS

| | | |
|---|---|---|
| CA | 2177095 A1 | 11/1996 |
| CA | 2242783 A1 | 1/1999 |
| CA | 2242801 A1 | 1/1999 |
| CA | 2243091 A1 | 1/1999 |
| EP | 0641824 A1 | 3/1995 |
| EP | 0801112 A2 | 10/1997 |
| EP | 0824131 A1 | 2/1998 |

(Continued)

*Primary Examiner* — Angela C Scott

(74) *Attorney, Agent, or Firm* — Meredith E. Hooker; Arthur M. Reginelli

(57) ABSTRACT

A method for preparing a vulcanizable elastomeric composition where, in a first mixing step, ingredients including an elastomer having a silica-interactive functional group, a filler comprising silica, and optionally, a catalyst, are mixed, and the amount of polar compounds is limited.

9 Claims, No Drawings

(56) References Cited

FOREIGN PATENT DOCUMENTS

| | | |
|---|---|---|
| EP | 0890580 A1 | 1/1999 |
| EP | 0890603 A1 | 1/1999 |
| EP | 0926192 A1 | 6/1999 |
| EP | 0972790 A1 | 1/2000 |
| EP | 0972799 A1 | 1/2000 |
| EP | 1031604 A2 | 8/2000 |
| EP | 1061097 A1 | 12/2000 |
| JP | 11181161 A | 7/1999 |
| WO | 9902601 A1 | 1/1999 |
| WO | 0005300 A1 | 2/2000 |
| WO | 0005301 A1 | 2/2000 |
| WO | 0032684 A1 | 6/2000 |
| WO | WO 02/31034 * | 4/2002 |
| WO | WO 02/38615 | 5/2002 |
| WO | WO 02/38663 | 5/2002 |
| WO | WO 02/40582 | 5/2002 |
| WO | WO 02/081233 | 10/2002 |
| WO | WO 03/037655 * | 5/2003 |

* cited by examiner

METHOD OF PRODUCING A TIRE COMPOSITION HAVING IMPROVED SILICA REINFORCEMENT

This application claims the benefit of U.S. Provisional Application No. 60/565,723, filed Apr. 27, 2004, and International Application No. PCT/US2005/014561, Filed Apr. 27, 2005.

FIELD OF THE INVENTION

This invention relates to a method for preparing a vulcanizable elastomeric composition, which is useful in producing tire compositions with improved silica reinforcement.

BACKGROUND OF THE INVENTION

Inorganic fillers, such as silica, impart improved wet traction, rolling resistance, tear strength, snow traction and other performance parameters when used as filler within tire treads. Mixing silica into a tire stock, however, is difficult because silica particles agglomerate extensively and therefore they are not easily dispersed. In addition, silica particles are less compatible than carbon black with rubber molecules. In response, processing and dispersing aids and coupling agents are used during compounding.

In the art of making tires, it is desirable to employ rubber vulcanizates that demonstrate improved rolling resistance, wet skid resistance, and reduced hysteresis loss at certain temperatures. Factors believed to affect these properties include the degree of filler networking (particle agglomeration), the degree of polymer-filler interaction, the cross-link density of the rubber, and polymer free ends within the cross-linked rubber network.

Because precipitated silica has been increasingly used as reinforcing particulate filler in tires, there is a need to overcome the processing problems associated with silica fillers. Additionally, there is a need to increase polymer-filler interaction in silica-filled tires, thereby improving rolling resistance, wear resistance, and wet skid resistance.

SUMMARY OF THE INVENTION

In general the present invention provides a method for preparing a vulcanizable elastomeric composition, the method comprising the steps of (a) mixing, at a mixer temperature of at least 25° C., an elastomer having a silica-interactive functional group, a filler comprising silica, and optionally a catalyst, to form an initial composition, where said initial composition comprises less than about 5 parts by weight of any of zinc oxide, sulfur, or cure agents per hundred parts by weight rubber; (b) mixing the initial composition obtained in step (a), at a temperature of from about 70° C. to about 175° C., optionally with a silica coupling agent, a silica processing aid and additional filler, to form an intermediate composition; and (c) mixing the intermediate composition obtained in step (b), at a surface temperature lower than a vulcanization temperature, with a cure agent and, optionally, a cure accelerator, to form a vulcanizable elastomer composition.

The present invention also includes a method for preparing a vulcanizable elastomeric composition, the method comprising the steps of mixing ingredients consisting essentially of an elastomer having a silica-interactive functional group, a filler comprising silica, optionally, a catalyst that may include a carrier, optionally, one or more additional fillers, optionally, one or more additional elastomers, and optionally, one or more non-polar ingredients, to form an initial composition, mixing the initial composition with ingredients comprising a silica coupling agent, optionally, a silica processing aid, and optionally, additional filler, to form an intermediate composition, and mixing the intermediate composition with ingredients comprising a cure agent, and optionally, a cure accelerator, to form a vulcanizable elastomeric composition.

The present invention further includes a method for preparing vulcanizable compositions of the type that are prepared by mixing silica and an elastomer, the improvement comprising mixing an elastomer having a silica-interactive functional group with silica in the substantial absence of zinc oxide, sulfur, cure agents, silica coupling agents, and silica processing aids at a temperature in excess of about 120° C.

DETAILED DESCRIPTION OF ILLUSTRATIVE EMBODIMENTS

In one or more embodiments, vulcanizable elastomeric compositions are prepared by using a method that includes at least three mixing steps. In a first mixing step, ingredients including an elastomer having a silica-interactive functional group, a filler comprising silica or a mixture thereof with carbon black, and optionally a catalyst are mixed to form an initial composition. Within this first step, the presence of zinc oxide, sulfur and cure agents is limited. Also, the presence of silica processing aids, silica coupling agents, and other polar compounds is preferably limited. In an optional second mixing step, the initial composition is further mixed and optionally combined with ingredients including silica coupling agents, optionally additional filler, and optionally silica processing aids, to form an intermediate composition. In a third mixing step, a cure agent and optionally a cure accelerator may be added to form a vulcanizable elastomer composition.

Mixing step includes to mixing stages where ingredients are added as well as stages where the composition is simply mixed but no additional ingredients are added. Mixing steps where ingredients may be added are referred to as masterbatch steps, and the composition that is formed during a masterbatch step may be referred to as a masterbatch. In some processes, more than one masterbatch is formed, therefore it is useful to further denote the compositions as first masterbatch, second masterbatch and so on. Mixing steps where no additional ingredients are added can be referred to as remill steps and the resulting compositions may be referred to as remills.

In one or more embodiments, the method of this invention includes at least three mixing steps that are referred to as first, second and third mixing steps. The method may, however, include additional mixing steps that may be performed before or after any of the recited first, second or third steps. For example, the method may include a remill step between the second and third mixing steps.

In one embodiment, an elastomer having a silica-interactive functional group, a filler comprising silica, optionally a second functionalized or non-functionalized elastomer, and optionally a catalyst that may include a carrier, are combined in a first mixing step. This resulting mixture may be called an initial composition or first masterbatch.

The elastomer having a silica-interactive functional group attached thereto may include any elastomer conventionally employed in vulcanizable elastomeric compositions. Elastomers, which are sometimes called rubbery elastomers or rubbery polymers, include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Examples of rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Preferred elastomers include homopolymers or copolymers of conjugated $C_4$-$C_{12}$ dienes, $C_8$-$C_{18}$ monovinyl aromatic monomers, and $C_6$-$C_{20}$ trienes. In one embodiment, the elastomer includes a copolymer of styrene and butadiene.

A silica-interactive functional group includes a group or moiety that will react or interact with silica. The reaction or interaction of the silica-interactive functional group with the silica may occur via chemical reaction, resulting in an ionic or covalent bond between the functional group and the silica particle. Alternately, the interaction of the silica-interactive functional group with the silica may occur via through-space interaction (e.g., hydrogen bonding, van der Waals interaction, etc.). And, the interaction may be an attraction that creates a domain within the rubber matrix of the polymer. The interaction may be an affinity toward filler particles that is activated after processing of a vulcanized rubber formulation, e.g., during cure.

In one or more embodiments, the functional groups that react or interact with silica are typically basic; i.e. they are electron donors or are capable of reacting with a proton. Exemplary groups include alkoxysilyl, amine, hydroxyl, polyalkylene glycol, epoxy, carboxylic acid, and anhydride groups, as well as polymeric metal salts of carboxylic acids.

Examples of elastomer containing an alkoxysilyl functional group include those represented by the formula

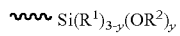 $Si(R^1)_{3-y}(OR^2)_y$ where 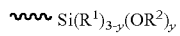 is an elastomeric polymer, each $R^1$ is independently a halogen or a monovalent organic group, each $R^2$ is independently a monovalent organic group, and y is an integer from 1 to 3. Halogens include chlorine, bromine, iodine, and fluorine. In one embodiment, the halogen includes chlorine.

Monovalent organic groups include hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. In certain embodiments, $R^2$ has from 1 to about 4 carbon atoms.

In one embodiment, the alkoxysilyl-functionalized elastomer may be prepared by initiating polymerization with an alkoxysilyl-containing initiator. In another embodiment, the alkoxysilyl-functionalized elastomer is prepared by reacting a living polymer chain with a siloxane terminating agent. Preparation of living polymer is well-known. Anionically polymerized diene polymers and copolymers containing functional groups derived from siloxane terminating agents are further described in U.S. Pat. Nos. 6,008,295 and 6,228,908, incorporated herein by reference.

Any siloxane compound that will react with the living terminal of a living polymer chain to form an alkoxysilyl-functionalized elastomer may be used. Useful siloxane compounds include those represented by the formula $(R^1)_{4-z}Si(OR^2)_z$ where $R^1$ and $R^2$ are as described above, and z is an integer from 1 to 4. Suitable examples of siloxane terminating agents include tetraalkoxysilanes, alkylalkoxysilanes, arylalkoxysilanes, alkenylalkoxysilanes, and haloalkoxysilanes.

Examples of tetraalkoxysilane compounds include tetramethyl orthosilicate, tetraethyl orthosilicate, tetrapropyl orthosilicate, tetrabutyl orthosilicate, tetra(2-ethylhexyl)orthosilicate, tetraphenyl orthosilicate, tetratoluyloxysilane, and the like.

Examples of alkylalkoxysilane compounds include methyltrimethoxysilane, methyltriethoxysilane, methyltri-n-propoxysilane, methyltri-n-butoxysilane, methyltriphenoxysilane, ethyltrimethoxysilane, ethyltriethoxysilane, ethyltri-n-propoxysilane, ethyltri-n-butoxysilane, ethyltriphenoxysilane, dimethyldimethoxysilane, dimethyldiethoxysilane, dimethyldi-n-propoxysilane, dimethyldi-n-butoxysilane, dimethyldiphenoxysilane, diethyldimethoxysilane, diphenyldimethoxysilane, 3-glycidoxypropyltrimethoxysilane (GPMOS), γ-methacryloxy propyl trimethoxysilane and the like.

Examples of arylalkoxysilane compounds include phenyltrimethoxysilane, phenyltriethoxysilane, phenyltri-n-propoxysilane, phenyltri-n-butoxysilane, phenyltriphenoxysilane, and the like.

Examples of alkenylalkoxysilane compounds include vinyltrimethoxysilane, vinyltriethoxysilane, vinyltri-n-propoxysilane, vinyltri-n-butoxysilane, vinyltriphenoxysilane, allyltrimethoxysilane, octenyltrimethoxysilane, divinyldimethoxysilane, and the like.

Examples of haloalkoxysilane compounds include trimethoxychlorosilane, triethoxychlorosilane, tri-n-propoxychlorosilane, tri-n-butoxychlorosilane, triphenoxychlorosilane, dimethoxydichlorosilane, diethoxydichlorosilane, di-n-propoxydichlorosilane, diphenoxydichlorosilane, methoxytrichlorosilane, ethoxytrichlorosilane, n-propoxytrichlorosilane, phenoxytrichlorosilane, trimethoxybromosilane, triethoxybromosilane, tri-n-propoxybromosilane, triphenoxybromosilane, dimethoxydibromosilane, diethoxydibromosilane, di-n-propoxydibromosilane, diphenoxydibromosilane, methoxytribromosilane, ethoxytribromosilane, n-propoxytribromosilane, phenoxytribromosilane, trimethoxyiodosilane, triethoxyiodosilane, tri-n-propoxyiodosilane, triphenoxyiodosilane, dimethoxydiiodosilane, di-n-propoxydiiodosilane, diphenoxydiiodosilane, methoxytriiodosilane, ethoxytriiodosilane, n-propoxytriiodosilane, phenoxytriiodosilane, and the like.

Other useful silanes include bis-(trimethoxysilane)-ether, 3-mercaptopropyltriethoxysilane, 3-mercaptopropyltrimethoxysilane, (triethoxysilylpropyl)disulfide, Si-69 (bis-(3-triethoxysilylpropyl)tetrasulfide) and the like.

In one embodiment, the hydroalkyoxy silane terminating agent includes tetraethyl orthosilicate.

Where the elastomer contains an amine group, the amine functional group is not particularly limited, and may be a primary, secondary or tertiary amine, cyclic or acyclic. Elastomers having cyclic amino substituents are known in the art, and are further described in U.S. Pat. Nos. 6,080,835, 5,786,441, 6,025,450, and 6,046,288, which are incorporated herein by reference.

An elastomer having a silica-interactive group may include epoxidized rubber. Epoxidized rubber includes modified rubber where some of the rubber's unsaturation is replaced by epoxide groups. Epoxidized rubber is further described in co-pending U.S. application Ser. No. 10/269,445, which is incorporated herein by reference.

Elastomers having carboxylic acid, and anhydride groups, and polymeric metal salts of unsaturated carboxylic acids include those described in co-pending application no. PCT/US02/10621, which is incorporated herein by reference.

Silica (silicon dioxide) includes wet-process, hydrated silica produced by a chemical reaction in water, and precipitated as ultra-fine spherical particles. These particles strongly associate into aggregates that in turn combine less strongly into agglomerates. The surface area, as measured by the BET method, gives the best measure of the reinforcing character of different silicas. In one embodiment, the silica has a surface area of about 32 to about 400 $m^2/g$, in another embodiment about 100 to about 250 $m^2/g$, and in yet another embodiment about 150 to about 220 $m^2/g$. The pH of the silica filler is generally about 5.5 to about 7 and preferably about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ S/kg (Bayer AG), Ultrasil™ VN2, VN3 (Degussa), and HuberSil™ 8745 (Huber).

In one embodiment, silica may be used in an amount from about 1 to about 100 parts by weight phr, in another embodiment, from about 15 to about 90 parts by weight phr, and in yet another embodiment, from about 20 to about 80 parts by weight phr.

The vulcanizable elastomeric compositions can optionally also include carbon black. Useful carbon black includes any commonly available carbon black. In one embodiment, the carbon black includes a surface area (EMSA) of at least 20 $m^2/g$, and in another embodiment, at least 35 $m^2/g$ up to 200 $m^2/g$ or higher. Surface area values used in this application are those determined by ASTM test D-1765 by using the cetyltrimethyl-ammonium bromide (CTAB) technique.

If desired, carbon black may be used in an amount from about 0.5 to about 70 parts by weight phr. In one embodiment, carbon black is employed in an amount of from about 1 to about 50 parts by weight phr, and in another embodiment from about 2 to about 40 parts by weight phr. In one or more embodiments, where silica and carbon black are used in combination, certain formulations will include from about 10 to about 50 parts by weight silica and from about 10 to about 50 parts by weight carbon black per 100 parts by weight rubber. Certain formulations will include from about 30 to about 40 parts by weight silica and from about 30 to about 40 parts by weight carbon black per 100 parts by weight rubber.

Other reinforcing and non-reinforcing fillers that may optionally be used include aluminum hydroxide, magnesium hydroxide, clays (hydrated aluminum silicates), and starch.

Any catalyst that enhances the reaction between silica and the silica-interactive group of the elastomer may optionally be used. Examples of catalysts include strong organic bases. In certain embodiments, the strong organic base may be characterized by a $pK_a$ at 25° C. of greater than about 10, in another embodiment greater than about 11, and in yet another embodiment greater than about 12. In one embodiment, the $pK_a$ of the catalyst is from about 11 to about 18. The $pK_a$ is typically the negative logarithm (to the base 10) of the acid dissociation constant $K_a$ of the catalyst. Generally, the acid dissociation constant of compound HA is the equilibrium constant of the dissociation of HA in water and may be calculated according to the formula:

$$K_a = [H^+][A^-]/[HA]$$

where $[H^+]$ is the molar concentration of hydronium ions, $[A^-]$ is the molar concentration of the anion $A^-$, and $[HA]$ is the molar concentration of the undissociated compound HA.

Examples of strong organic bases include 1,3-diphenylguanidine (DPG) and N,N-dimethyl-1-octadecylamine. Other bases are disclosed in WO02/40582, and U.S. Pat. No. 5,939,484, which are incorporated herein by reference.

In one embodiment, the catalyst is added during the first mixing step. The amount of catalyst is not particularly limited, but in one embodiment is from about 0 to about 10 parts by weight phr, in another embodiment, from about 0.005 to about 5 parts by weight phr, and in yet another embodiment, from about 0.01 to about 3 parts by weight phr.

In one embodiment, the catalyst is premixed with a carrier. Suitable carriers include any material that is not deleterious to the vulcanizable elastomeric composition. Examples include stearic acid, mineral oil, plastics, wax and organic solvents. In one embodiment, the premix contains from about 1 part by weight catalyst per 3 parts by weight carrier to about 1 part by weight catalyst per 1 part by weight carrier, with the proviso that, where the carrier is a polar substance, the amount of carrier does not exceed about 2 parts by weight per hundred parts rubber.

One or more additional elastomers that may be added during the first mixing step include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

In one embodiment, from about 5 to about 100 percent, in another embodiment, from about 10 to about 90 percent, of the elastomer molecules are functionalized with the silica-interactive functional group. The remainder of the elastomer molecules may be non-functionalized or may contain functional groups that are not silica-interactive.

In certain embodiment, the amount of zinc oxide, sulfur and cure agents present during the first mixing stage is limited. In these or other embodiments, the amount of silica processing aids, silica coupling agents and other polar compounds is also limited. While it is acknowledged that the functionalized elastomer and silica may have some polar character, it is desirable to reduce or eliminate the presence of all other polar compounds. Therefore, the term other polar compounds may be used to refer to those polar compounds in addition to zinc oxide, silica processing aids, and silica coupling agents, as well as the elastomer having a silica-interactive functional group, the silica, and the catalyst. For example, other polar ingredients that may be limited include stearic acid, although the catalyst is often associated with a carrier such as stearic acid and therefore it may not be practical to completely eliminate the presence of all other polar compounds. The compounds that may be limited from the first mixing step may be referred to collectively as the limited compounds.

In one embodiment, the amount of any individual limited compound present during the first mixing stage is less than about 5 parts by weight phr, in another embodiment, less than about 3 parts by weight phr, in yet another embodiment, less than about 2 parts by weight phr, in still another embodiment, 0.5 parts by weight phr, in yet another embodiment, less than about 0.2 parts by weight phr, and in still yet another embodiment, less than about 0.1 parts by weight phr. In certain embodiments, the first mixing step is executed in the substantial absence of the limited compounds. Substantial absence refers to an amount that is less than the amount that would have an appreciable impact on the method of the present invention. In one embodiment, the first mixing step is devoid of zinc oxide, silica processing aids, silica coupling agents, and other polar compounds.

Temperatures may be referred to in terms of the mixer temperature, which refers to the stabilized temperature of the mixing equipment prior to addition of the ingredients, or the surface temperature of the composition, which is an actual temperature reading of the composition. Unless specifically referred to as the mixer temperature, any reference to temperature in this specification refers to the surface temperature of the composition.

For the first mixing step, the initial mixer temperature is, in one embodiment, at least about 25° C., in another embodiment at least about 50° C., in yet another embodiment at least about 60° C. In one embodiment, the initial mixer temperature is from about 70° C. to about 125° C. The mixing conditions may be controlled to maintain the surface temperature of the composition within the range of about 25° C. to about 195° C., in one embodiment, from about 100° C. to about 185° C., in another embodiment, about 120° C. to about 170° C., and in yet another embodiment, about 135° C. to about 165° C. during mixing. These mixing conditions may be maintained for the amount of time necessary to achieve good dispersion of the filler within the rubber. One of ordinary skill in the art will appreciate that the necessary amount of time will vary depending upon such factors as mixer size, sheer, temperature, and the like.

The order of addition of the ingredients is not critical, with the proviso that, in one or more embodiments when a catalyst is employed, the elastomer is added prior to or together with the catalyst. In one embodiment, the elastomer is added first, and then all of the other ingredients are added at once. In another embodiment, the silica filler is added in increments. If desired, the temperature of the composition can be decreased before each incremental addition, then brought back to the preferred mixing temperatures set forth above.

In one embodiment, the initial composition is cooled after mixing to a surface temperature below the intended temperature for the second mixing step. For example, when the desired surface temperature of the second masterbatch composition during the second mixing step is about 150° C., the initial composition may be cooled to a surface temperature of below about 150° C. This may be accomplished by discharging the initial composition, cooling, and re-charging the same mixer apparatus or transferring the composition to another mixer. If the same mixing apparatus is to be used for the second mixing step, the initial composition may be cooled within the mixer.

The initial composition is further mixed in a second mixing step, during which additional ingredients may optionally be added, including silica coupling agents, silica processing aids, and additional filler. This resulting mixture may be referred to as an intermediate composition. If additional ingredients are added during the second mixing step, the intermediate composition may also be referred to as a second masterbatch. In one embodiment, a portion of the silica filler is added during the second mixing step.

Silica coupling agents include bifunctional silica coupling agents having a moiety (e.g., a silyl group) that will react or interact with the silica filler, and a moiety (e.g., a mercapto, amino, vinyl, epoxy or sulfur group) that will react or interact with the elastomer. Examples of silica coupling agents are bis(trialkoxysilylorgano)polysulfides and mercaptosilanes.

Bis(trialkoxysilylorgano)polysulfides include bis(trialkoxysilylorgano)disulfides and bis(trialkoxysilylorgano)tetrasulfides. Examples of bis(trialkoxysilylorgano)disulfides include 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof.

Examples of bis(trialkoxysilylorgano)tetrasulfide silica coupling agents include bis(3-triethoxysilylpropyl)tetrasulfide, bis(2-triethoxysilylethyl)tetrasulfide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold commercially as Si69 by Degussa.

Mercaptosilanes include compounds represented by the formula

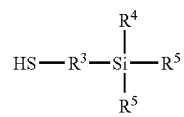

where $R^3$ is a divalent organic group, $R^4$ is a halogen atom or an alkoxy group, and each $R^5$ is independently a halogen, an alkoxy group, or a monovalent organic group. The monovalent organic group is as described above. Halogens include chlorine, bromine, iodine, and fluorine. The alkoxy group preferably has from 1 to 3 carbon atoms. In one embodiment, the halogen includes chlorine.

The divalent organic group may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group containing from 1 carbon atom, or the appropriate minimum number of carbon atoms to form the group, up to about 20 carbon atoms. In once embodiment, the divalent organic group includes an alkylene group containing from 1 to about 4 carbon atoms.

Examples of mercaptosilanes include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptoodadecyldiethoxychlorosilane, and mixtures thereof.

Silica coupling agents are further described in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 and 5,696,197, 6,608,145, and 6,667,362, which are incorporated herein by reference. In one or more embodiments, the silica coupling agent includes bis(3-triethoxysilylpropyl)disulfide (Disulfane). In one embodiment, the silica coupling agent may be added in an amount of from about 0.01 to about 25 weight percent, based upon the weight of the silica, in another embodiment, from about 0.5 to about 15 weight percent, and in yet another embodiment, from about 1 to about 10 weight percent, based upon the weight of silica. In certain embodiments, the amount of silica coupling agent may be reduced in the method of the present invention, when compared to conventional methods, due to the increased interaction of silica and functionalized polymer provided in the first mixing step.

Silica processing aids may be used to aid in, for example, dispersing and/or shielding the silica particles, preventing agglomeration, reducing viscosity, and increasing scorch time. Generally, silica processing aids do not substantially interact with the rubber molecules. Silica processing aids include monofunctional compounds that chemically react with surface silanol groups on the silica particles, but are not reactive with the elastomer. Silica processing aids also include shielding agents that physically shield the silanol groups, to prevent reagglomeration or flocculation of the silica particles.

Examples of silica processing aids include glycols, alkyl alkoxysilanes, fatty acid esters of hydrogenated and non-hydrogenated $C_5$ and $C_6$ sugars, polyoxethylene derivatives of the fatty acid esters, mineral fillers, and non-mineral fillers. These silica dispersing agents can be used to replace all or part of the bifunctional silica coupling agents, while improving the processability of silica-filled rubber compounds by reducing the compound viscosity, increasing the scorch time, and reducing silica reagglomeration. Specific examples of glycols include diethylene glycol or polyethylene glycol.

Alkyl alkoxysilanes that may be used as silica processing aids include those that can be represented by the formula

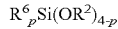

where each $R^2$ is independently as described above, each $R^6$ is independently a monovalent organic group, and p is an integer from 1 to 3, with the proviso that at least one $R^6$ is an alkyl group. In one embodiment, p is 1.

Examples of alkyl alkoxysilanes include octyl triethoxysilane, octyl trimethoxysilane, trimethyl ethoxysilane, cyclohexyl triethoxysilane, isobutyl triethoxysilane, ethyl trimethoxysilane, cyclohexyl tributoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane. In one embodiment, the alkyl alkoxysilane is a triethoxysilane. In another embodiment, the alkyl alkoxysilane is selected from at least one of n-octyl triethoxysilane, n-hexadecyl triethoxysilane, n-octadecyl triethoxysilane, and methyl n-octyl diethoxysilane.

The alkyl alkoxysilane may be present in an amount of about 0.1% to about 25% by weight in one embodiment, and in another embodiment, from about 0.1% to about 15% by weight, based on the weight of the silica.

Examples of fatty acid esters of hydrogenated and non-hydrogenated $C_5$ and $C_6$ sugars (e.g., sorbose, mannose, and arabinose) that are useful as silica processing aids include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan include the sorbitan monooleates known as Alkamul® SMO, Capmul® O, Glycomul® O, Arlacel® 80, Emsorb® 2500, and S-Maz® 80. When used with bis(trialkoxysilylorgano)polysulfide silica coupling agents, these fatty acid esters are, in one embodiment, present in an amount of from about 0.1% to about 25% by weight based on the weight of the silica, in another embodiment, from about 0.5% to about 20% by weight of silica, and in yet another embodiment, from about 1% to about 15% by weight based on the weight of silica.

Examples of polyoxyethylene derivatives of fatty acid esters of hydrogenated and non-hydrogenated $C_5$ and $C_6$ sugars include polysorbates and polyoxyethylene sorbitan esters, which are analogous to the fatty acid esters of hydrogenated and non-hydrogenated sugars noted above except that ethylene oxide groups are placed on each of the hydroxyl groups. Commercially available polyoxyethylene derivatives of sorbitan include POE® (20) sorbitan monooleate, Polysorbate® 80, Tween® 80, Emsorb® 6900, Liposorb® O-20, and T-Maz® 80. The Tween® products are commercially available from ICI Specialty Chemicals. In one embodiment, the silica dispersing aid is employed in an amount of from about 0.1% to about 25% by weight based on the weight of the silica, in another embodiment, from about 0.5% to about 20% by weight, and in yet another embodiment, from about 1% to about 15% by weight based on the weight of the silica. In one embodiment, the silica processing aid includes n-octyltriethoxysilane.

Certain additional fillers can be utilized as processing aids, including mineral fillers, such as clay (hydrous aluminum silicate), talc (hydrous magnesium silicate), aluminum hydrate [Al(OH)$_3$] and mica, as well as non-mineral fillers such as urea and sodium sulfate. Exemplary micas principally contain alumina and silica. In one embodiment, these fillers are employed in the amount of from about 0.5 to about 40 parts per phr, in another embodiment, in an amount of about 1 to about 20 phr, and in yet another embodiment, in an amount of about 1 to about 10 phr. These additional fillers can also be used as non-reinforcing fillers to support any of the silica dispersing aids and silica coupling agents described above. Silica processing aids are further described in U.S. Pat. Nos. 6,342,552, 6,525,118 and 6,608,145, which are incorporated herein by reference.

In one or more embodiments, the mixing conditions during the second mixing step, may be controlled to achieve a surface temperature of the composition of about 70° C. to about 175° C., in another embodiment, about 13° C. to about 165° C., and in yet another embodiment, about 140° C. to about 160° C. These mixing conditions are maintained for the amount of time necessary to reduce the viscosity and improve the dispersion of the filler within the rubber. One of ordinary skill in the art will appreciate that the necessary amount of time will vary depending upon such factors as mixer size, sheer, temperature, and the like. In one embodiment, the intermediate composition is cooled to approximately room temperature after the second mixing step.

In the third mixing step, the intermediate composition may be combined with ingredients including a cure agent and, optionally, a cure accelerator and zinc oxide, at a surface temperature below the vulcanization temperature. In certain embodiments, the mixing conditions are controlled to achieve a surface temperature of the composition within the range of about 40° C. to about 120° C., in another embodiment, about 60° C. to about 110° C., and in yet another embodiment, about 75° C. to about 100. These conditions may be maintained for the amount of time necessary to achieve good mixing.

A multitude of rubber curing agents may be employed, including sulfur or peroxide-based curing systems. Curing agents are described in *Kirk-Othmer, Encyclopedia of Chemical Technology*, Vol. 20, pp. 365-468, (3$^{rd}$ Ed. 1982), particularly *Vulcanization Agents and Auxiliary Materials*, 390-402, and A. Y. Coran, *Vulcanization in Encyclopedia of Polymer Science and Engineering*, (2$^{nd}$ Ed. 1989), which are incorporated herein by reference. Vulcanizing agents may be used alone or in combination.

Examples of cure accelerators include thiazoles, dithiocarbamates, dithiophosphates, guanidines, sulfenamides, sulfenimides, and thiurams. Specific examples include 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine. In one embodiment, an accelerator is employed in an amount of from about 0.1 to about 5 phr, in another embodiment, from about 0.2 to about 3 phr.

If desired, zinc oxide may be added during the third mixing step, in an amount of from about 1 to about 5 phr.

Other ingredients that may be employed include oils, waxes, scorch inhibiting agents, tackifying resins, reinforcing resins, fatty acids such as stearic acid, peptizers, and one or more additional rubbers. These ingredients are known in the art, and may be added during any of the mixing steps as desired, subject to the above-described limitations on zinc oxide, silica coupling agents, silica processing aids, other polar compounds, sulfur and cure agents.

The designations "first mixing step," "second mixing step," and "third mixing step" are merely meant to denote sequence among the three enumerated mixing steps, and do not imply the absence of additional optional steps. In addition to the three mixing steps set forth above, additional mixing steps may be employed, during which additional ingredients may or may not be added. For example, a remill step, in which no additional ingredients are added, may be performed to reduce the viscosity and improve the dispersion of the filler within the rubber. These additional mixing steps may occur prior to or intermingled with the three mixing steps set forth above.

A remill step may be performed in the same mixer used for the masterbatches, or the mixture may be transferred to another mixer. In one embodiment, the mixing conditions during a remill step are controlled to achieve a surface temperature of the composition within the range of about 70° C. to about 175° C., in another embodiment, about 13° C. to about 165° C., and in yet another embodiment, about 140° C. to about 160° C. These mixing conditions may be maintained for an amount of time sufficient to reduce the viscosity and improve the dispersion of the filler within the rubber. One of ordinary skill in the art will appreciate that the preferred amount of time will vary depending upon such factors as mixer size, sheer, temperature, and the like.

The method of this invention is particularly useful in preparing tire components such as treads, subtreads, black sidewalls, body ply skins, bead filler, and the like. The construction and curing of the tire is not affected by the practice of this invention.

Rubber compounding techniques and the additives employed therein are further described in Stephens, *The Compounding and Vulcanization of Rubber*, in *Rubber Technology* (2$^{nd}$ Ed. 1973). The mixing conditions and procedures applicable to silica-filled tire formulations are also well known as described in U.S. Pat. Nos. 5,227,425, 5,719,207, 5,717,022, as well as European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Pneumatic tires can be made as discussed in U.S. Pat. Nos. 5,866,171, 5,876,527, 5,931, 211, and 5,971,046, which are incorporated herein by reference.

In certain embodiments, the tire compositions of this invention advantageously have improved rubber compound reinforcement, which is believed to be caused by increased polymer-filler interaction, which results in improved rolling resistance, reduced wear, and improved wet traction. Excellent polymer processability is maintained. These tire compositions can be readily prepared by the subject method.

In order to demonstrate the practice of the present invention, the following examples have been prepared and tested. The examples should not, however, be viewed as limiting the scope of the invention. The claims will serve to define the invention.

EXAMPLES

Trialkoxysilyl-functionalized SBR was prepared by polymerization of styrene and butadiene monomers and termination with tetraethyl orthosilicate. To a 18.9 L reactor equipped with turbine agitator blades was added 4.8 kg hexane, 1.22 kg (33 wt %) styrene in hexane, and 7.39 kg (22.1 wt %) 1,3-butadiene in hexane. To the reactor was charged 11 mL of 1.68 M n-butyllithium in hexane and 3.83 mL of 1.6 M 2,2'-di(tetrahydrofuryl)propane in hexane and the batch temperature was controlled at from 50° C. to about 58° C. After approximately 45 minutes, the batch was cooled to 32° C. and a measured amount of live poly(styrene-co-butadiene)cement was then transferred to a sealed nitrogen purged 800 mL bottle. The bottle contents were then terminated with 1 equivalent of tetraethyl orthosilicate, coagulated and drum dried. NMR analysis of this base polymer indicated a styrene content of about 34 percent and approximately 17 percent of the butadiene in the 1,2-configuration. The polymer was characterized as shown in Table I.

TABLE I

| Polymer Characteristics | |
|---|---|
| $M_w$ (kg/mol) | 295 |
| $M_n/M_w$ (kg/mol) | 1.51 |
| $ML_{1+4}$ @ 100° C. | 25-100 |
| $T_g$ (° C.) | −45 |

Samples 1-3

The trialkoxysilyl-functionalized SBR polymer prepared above was employed in a conventional carbon black/silica tire tread formulation to produce three samples.

Each formulation was prepared in three stages named Initial, Intermediate, and Final. In the Initial stage for Sample 1, alkoxysilyl-functionalized SBR and natural rubber were mixed with silica, tread-grade carbon black, about 2 phr anti-degradants, about 2 phr stearic acid, about 2.5 phr zinc oxide, processing oil, and about 1 phr strong organic base in a 1.4 kg Banbury mixer operating at 77 RPM and initially at about 90-99° C. The initial ingredients were mixed for 1.5 minutes. At the end of the mixing the surface temperature of the initial composition was approximately 154° C. The initial composition cooled to less than about 80° C. and transferred to a second mixer.

In the Intermediate mixing stage, the initial composition was mixed with about 2 phr disulfane at about 77 RPM. The starting temperature of the mixer was about 80° C. The intermediate material was removed from the mixer after about 2 minutes, when the surface temperature of the intermediate composition was between 135 and 150° C.

In the final mixing stage the intermediate composition, sulfur and accelerators were added to the mixer simultaneously. The starting mixer temperature was 62° C. and it was operating at 77 RPM. The final composition was removed from the mixer after 1 minute, when the surface temperature of the material was about 93° C.

Sample 2 was prepared according to the same method as Sample 1, except that the zinc oxide was not added to the initial composition, but was added during the final mixing stage. Sample 3 was prepared according to the same method as Sample 2, except that a different strong organic base was employed.

Test specimens of each rubber formulation were prepared by cutting out the required mass from an uncured sheet (about 2.5 mm to 3.81 mm thick), and cured within dosed cavity molds under pressure for 15 minutes at 171° C. The test specimens were then subjected to various physical tests, and the results of these tests are reported in Table II. Tensile mechanical properties were measured using ASTM-D 412 at 25° C. Tear mechanical properties were measured using ASTM-D 624 at 171° C. Dynamic properties were determined by using a Rheometrics Dynamic Analyzer (RDA). Tan δ was obtained from temperature sweep experiments conducted with a frequency of 31.4 rad/sec using 0.5% strain for temperatures ranging from −100° C. to −10° C., and with 2% strain for temperatures ranging from −10° C. to 100° C. Strain sweep experiments were used to obtain) G' data, at a frequency of 3.14 rad/sec and a temperature of 65° C., with strain sweeping from 0.25% to 14.75%.

Bound rubber, a measure of the percentage of rubber bound, through some interaction, to the filler, was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula % bound rubber=$(100(W_d-F))/R$ where $W_d$ is the weight of the dried residue, F is the weight of the filler and any other solvent insoluble matter in the original sample, and R is the weight of the rubber in the original sample.

The Zwick Rebound Test is a dynamic test that measures rebound resilience. Rebound resilience is typically defined as the ratio of mechanical energies before and after impact. Samples were tested according to ASTM D1054-91(2000). Sample specimens were milled and cured according to ASTM D1054, using the mold specified. The cured sample was coated with talc and conditioned in an oven for about one hour at the recommended temperature. The conditioned sample was placed into a Zwick type rebound tester, a pendulum was swung against the sample, and the angle at which the pendulum bounced back was measured. Percent rebound is calculated according to the equation specified in ASTM D1054.

Wet traction of rubber was evaluated using a British Portable Skid Tester (BPST), further described in ASTM E-303, Vol. 04.03. The Lambourn test was used to evaluate the wear resistance of the samples. Specifically, samples shaped like donuts with an inside diameter of about 2.86 cm, an outer diameter of about 4.83 cm, and a thickness of about 0.495 cm were placed on an axle and run at a slip ratio of 25% against a driven abrasive surface. The Abrasion Index was obtained according to the following equation:

index={(abrasion loss of control piece)/(abrasion loss of sample piece)}×100

TABLE II

| | Sample No. | | |
|---|---|---|---|
| | 1 | 2 | 3 |
| 50% Modulus 25° C. (Mpa) | 1.19 | 1.17 | 1.12 |
| 300% Modulus @ 25° C. (MPa) | 9.85 | 10.46 | 7.17 |
| Tensile at Break @ 25° C. (MPa) | 16.69 | 20.46 | 20.79 |
| Elongation at Break @ 25° C. | 572 | 719 | 671 |
| Toughness @ 25° C. (Mpa) | 41.67 | 62.63 | 58.63 |
| Tear Strength @ 171° C. (kN/m) | 15.42 | 19.62 | 14.0 |
| Elongation at Break @ 171° C. | 170 | 214 | 284 |
| tan δ @ 0° C. | 0.1883 | 0.1794 | 0.2673 |
| G' @ −20° C. (MPa) | 6.6 | 7.1 | 13 |
| G' @ 50° C. (MPa) | 2.2 | 2.3 | 2.24 |
| )G' @ 65° C. (MPa)* | 0.543 | 0.533 | 0.37 |
| tan δ @ 50° C. | 0.0921 | 0.0782 | 0.0815 |
| Bound Rubber (%) | 33.4 | 55.3 | — |
| BPST | 70 | 71 | — |
| Abrasion Index | 100 | 103 | — |
| Zwick Rebound (50° C.) | 70.0 | 72.2 | 71.6 |

*)G' = G' (@0.25% E)-G' (@14.5% E)

Samples 4-5

Samples 4 and 5 are carbon black/silica rubber compounds that were prepared in three stages named Initial, Intermediate, and Final. In the Initial stage for Example 4, alkoxysilyl-functionalized SBR and cis-polybutadiene were mixed with conventional amounts of silica and tread-grade carbon black, 10 phr non-reinforcing filler, about 1.5 phr wax, about 2 phr stearic acid, about 1.34 phr sorbitan trioleate, processing oil, about 3 phr processing aids, and about 1.5 phr N,N-dimethyl-1-octadecylamine in a 1.4 kg Banbury mixer operating at 77 RPM and initially at about 90-99° C. The initial ingredients were mixed for 1.5 minutes. At the end of the mixing the surface temperature of the initial composition was approximately 154° C. The initial composition was cooled to less than about 80° C. and transferred to a second mixer.

In the intermediate mixing stage, the initial composition was mixed with additional amounts of carbon black and silica, and about 2 phr disulfane at about 77 RPM. The starting temperature of the mixer was about 80° C. The intermediate material was removed from the mixer after about 2 minutes, when the surface temperature of the material was between 135 and 150° C.

In the final mixing stage the intermediate composition, sulfur, zinc oxide and accelerators were added to the mixer simultaneously. The starting mixer temperature was 62° C. and it was operating at 77 RPM. The final composition was removed from the mixer after 1 minute, when the surface temperature of the material was about 93° C.

Sample 5 was prepared according to the same method as Sample 4, except that the sorbitan trioleate, a polar compound, was not added to the initial composition, but was added during the intermediate mixing stage. Test specimens of each rubber formulation were prepared as described above for Samples 1-3. Results are shown in Table III. Zwick Rebound and Bound Rubber were tested as described above. The tan δ was obtained from temperature sweep experiments, strain sweep experiments, and from dynamic compression experiments, at 0° C. and at 50° C. The results at each temperature were averaged.

The sample geometry used for dynamic compression test is a cylindrical button with 9.5 mm in diameter and 15.6 mm in length. Sample was compressed under a static load of 2 kg before testing. After it reached an equilibrium state, the test started with a dynamic compression load of 1.25 Kg at a frequency of 1 Hz. The sample was then dynamically compressed and then extended and the resultant displacement, G', G", and hysteresis (tan δ) were then recorded.

TABLE III

|  | Sample No. | |
| --- | --- | --- |
|  | 4 | 5 |
| tan δ temp. sweep, 2% strain | 0.2534 | 0.2392 |
| tan δ @ 0° C., strain sweep | 0.2389 | 0.2186 |
| tan δ @ 0° C., MTS compression | 0.2333 | 0.2268 |
| average tan δ @ 0° C. | 0.2419 | 0.2282 |
| tan δ, temp. sweep, 2% strain | 0.3719 | 0.3681 |
| tan δ @ 50° C., strain sweep | 0.3295 | 0.3154 |
| tan δ @50° C. MTS compression | 0.3003 | 0.3012 |
| average tan δ @ 50° C. | 0.3339 | 0.3282 |
| G' @ 26° C. (MPa) | 7.08 | 7.86 |
| Bound Rubber (%) | 38 | 40 |
| Zwick Rebound (50° C.) | 47.4 | 49.8 |

Samples 6-7

The trialkoxysilyl-functionalized SBR polymer prepared above was employed in a conventional carbon black/silica tire tread formulation to produce Samples 6 and 7.

Each formulation was prepared in three stages named Initial, Intermediate, and Final. In the Initial stage for Sample 6, alkoxysilyl-functionalized SBR and natural rubber were mixed with silica, tread-grade carbon black, about 2 phr antidegradants, about 2 phr stearic acid, about 2 phr disulfane, processing oil, and about 1 phr N,N-dimethyl-1-octadecylamine in a 1.4 kg Banbury mixer operating at 77 RPM and initially at about 90-99° C. The initial ingredients were mixed for 1.5 minutes. At the end of the mixing the surface temperature of the initial composition was approximately 154° C. The initial composition cooled to less than about 80° C. and transferred to a second mixer.

In the Intermediate mixing stage, the initial composition was mixed at about 77 RPM. The starting temperature of the mixer was about 80° C. The intermediate material was removed from the mixer after about 2 minutes, when the surface temperature of the intermediate composition was between 135 and 150° C.

In the final mixing stage the intermediate composition, sulfur, zinc oxide and accelerators were added to the mixer simultaneously. The starting mixer temperature was 62° C. and it was operating at 77 RPM. The final composition was removed from the mixer after 1 minute, when the surface temperature of the material was about 93° C.

Sample 7 was prepared according to the same method as Sample 6, except that the disulfane was not added to the initial composition, but was added during the intermediate mixing stage.

TABLE IV

|  | Sample No. | |
| --- | --- | --- |
|  | 6 | 7 |
| 50% Modulus 25° C. (Mpa) | 0.91 | 0.94 |
| 300% Modulus @ 25° C. (MPa) | 7.22 | 7.78 |
| Tensile at Break @ 25° C. (MPa) | 20.38 | 18.54 |
| Elongation at Break @ 25° C. | 553 | 506 |
| Toughness @ 25° C. (Mpa) | 42.66 | 36.08 |
| Tear Strength @ 171° C. (kN/m) | 12.84 | 10.68 |
| Elongation at Break @ 171° C. | 318 | 256 |
| tan δ temp. sweep, 2% strain | 0.0898 | 0.1099 |
| tan δ @ 50° C., strain sweep | 0.0884 | 0.0948 |
| tan δ @ 50° C., strain sweep, 2% strain | 0.0870 | 0.0850 |
| tan δ @50° C., MTS compression | 0.0890 | 0.1005 |
| average tan δ @ 50° C. | 0.0885 | 0.1000 |
| tan δ, temp. sweep, 2% strain | 0.2352 | 0.2514 |
| tan δ @ 0° C., strain sweep, 2% strain | 0.1092 | 0.1525 |
| tan δ @ 0° C. MTS compression | 0.1710 | 0.1649 |
| average tan δ @ 0° C. | 1.1918 | 0.1883 |

Various modifications and alterations that do not depart from the scope and spirit of this invention will become apparent to those skilled in the art. This invention is not to be duly limited to the illustrative embodiments set forth herein.

What is claimed is:

1. A method for preparing a tire tread, the method comprising the steps of:
    (a) mixing within a mixer, an elastomer having a silica-interactive functional group, silica, and a catalyst, to form an initial composition having a surface temperature of about 135 to 195° C., where said step of mixing takes place in the substantial absence of zinc oxide, sulfur, or cure agents; and where said initial composition comprises less than about 0.5 parts by weight of any of silica processing aids, silica coupling agents, and other polar compounds per hundred parts by weight rubber;
    (b) discharging the initial composition from the mixer;
    (c) allowing the initial composition discharged in step (b) to cool to a surface temperature below a surface temperature intended for a second mixing step;
    (d) mixing, within a second mixing step, the initial composition cooled in step (c), optionally with a silica coupling agent, a silica processing aid and additional filler, to an intended temperature of 135 to 155° C. to form an intermediate composition;
    (e) mixing the intermediate composition obtained in step (d), at a surface temperature lower than a vulcanization temperature, with a cure agent, zinc oxide and, optionally, a cure accelerator, to form a vulcanizable elastomer composition;
    (f) extruding the vulcanizable elastomeric composition obtained in step (e) to form an extruded composition;
    (g) constructing a green tire from the extruded composition; and
    (h) curing the green tire.

2. The method of claim 1, where the silica-interactive group is an alkoxysilyl, amine, hydroxyl, polyalkylene glycol, epoxy, carboxylic acid, or anhydride group.

3. The method of claim 1, where the silica filler is added in increments.

4. The method of claim 1, where said silica coupling agent is a bis(trialkoxysilylorgano)polysulfide or mercaptosilane.

5. The method of claim 1, where mixing step (a) occurs in the substantial absence of zinc oxide, silica processing aids, silica coupling agents and other polar compounds.

6. The method of claim 1, where the catalyst is a strong organic base.

7. The method of claim 6, where the strong organic base is N,N-dimethyl-1-octadecylamine.

8. The method of claim 1, where step (a) occurs at a surface temperature of from about 135° C. to about 165° C.

9. The method of claim 1, where said step (a) comprises mixing, at a mixer temperature of at least 25° C., an trialkoxysilyl-functionalized SBR, a filler comprising silica, and a catalyst comprising a strong organic base, to form an initial composition.

\* \* \* \* \*